(12) United States Patent
Shen et al.

(10) Patent No.: US 12,423,305 B2
(45) Date of Patent: Sep. 23, 2025

(54) HIERARCHICAL QUERY METHODS AND APPARATUSES

(71) Applicant: BEIJING OCEANBASE TECHNOLOGY CO., LTD., Beijing (CN)

(72) Inventors: Dachuan Shen, Hangzhou (CN); Yi Pan, Hangzhou (CN); Longzhong Wang, Hangzhou (CN)

(73) Assignee: Beijing Oceanbase Technology Co., Ltd., Beijing (CN)

( * ) Notice: Subject to any disclaimer, the term of this patent is extended or adjusted under 35 U.S.C. 154(b) by 0 days.

(21) Appl. No.: 18/569,835

(22) PCT Filed: Jul. 7, 2022

(86) PCT No.: PCT/CN2022/104423
§ 371 (c)(1),
(2) Date: Dec. 13, 2023

(87) PCT Pub. No.: WO2023/000994
PCT Pub. Date: Jan. 26, 2023

(65) Prior Publication Data
US 2024/0281441 A1    Aug. 22, 2024

(30) Foreign Application Priority Data
Jul. 23, 2021   (CN) .................. 202110834690.0

(51) Int. Cl.
*G06F 16/2455*   (2019.01)
*G06F 16/22*   (2019.01)
*G06F 16/28*   (2019.01)

(52) U.S. Cl.
CPC ...... *G06F 16/2455* (2019.01); *G06F 16/2246* (2019.01); *G06F 16/285* (2019.01)

(58) Field of Classification Search
CPC ............. G06F 16/2455; G06F 16/2433; G06F 16/2471; G06F 16/245; G06F 16/285; G06F 16/2246; G06F 16/2282
See application file for complete search history.

(56) References Cited

U.S. PATENT DOCUMENTS

| 8,661,023 B1 | 2/2014 | Chun et al. |
| 9,454,573 B1 * | 9/2016 | Welton .................... G06F 16/11 |

(Continued)

FOREIGN PATENT DOCUMENTS

| CN | 108334571 A | 7/2018 |
| CN | 108431805 A | 8/2018 |

(Continued)

OTHER PUBLICATIONS

The International Search Report and Written Opinion of the International Searching Authority for International Application No. PCT/CN2022/104423 mailed on Sep. 30, 2022.

(Continued)

*Primary Examiner* — Huawen A Peng
(74) *Attorney, Agent, or Firm* — Womble Bond Dickinson (US) LLP

(57) ABSTRACT

A method is provided to process a hierarchical query request for requesting to query a target database table, where the hierarchical query request includes a query start condition and a connection condition. The method includes: in a first query round, first data is queried from the target database table based on the query start condition, and the first data is used as a root node of a tree structure; a plurality of pieces of service data in the target database table are grouped into N data groups corresponding to N worker threads based on the connection condition, where N is an integer greater than 1; and in an $i^{th}$ query round greater than 1, a leaf node in the current tree structure is selected as a parent node; and a target worker thread corresponding to the parent node is (Continued)

---

201 — In a first query round, query first data from a target database table based on a query start condition, and use the first data as a root node of a tree structure 203 — Group a plurality of pieces of service data in the target database table into N data groups corresponding to N worker threads based on a connection condition 205 — In an $i^{th}$ query round greater than 1, select a leaf node in the current tree structure as a parent node; determine a target worker thread corresponding to the parent node from the N worker threads based on the connection condition, so that the target worker thread queries second data from the data group corresponding to the target worker thread based on the parent node and the connection condition; and use the second data as a child node of the parent node determined from the N worker threads based on the connection condition.

12 Claims, 3 Drawing Sheets

(56) References Cited

U.S. PATENT DOCUMENTS

2006/0218123 A1* 9/2006 Chowdhuri ....... G06F 16/24532
2015/0331910 A1* 11/2015 Srinivasan ............ G06F 16/278
707/706

FOREIGN PATENT DOCUMENTS

CN 111352950 A 6/2020
CN 113282593 A 8/2021

OTHER PUBLICATIONS

Zhao, Aiqin et al. "Hierarchical tree queries mechanism in relation database system", Computer Engineering and Design, vol. 27, No. 18, Sep. 30, 2006 (Sep. 30, 2006), pp. 3454-3456.

* cited by examiner

HIERARCHICAL QUERY METHODS AND APPARATUSES

CROSS-RELATED APPLICATIONS

This specification is a U.S. National Stage Application of PCT Application Serial No. PCT/CN2022/104423, filed on Jul. 7, 2022, which claims priority to Chinese Patent Application No. 202110834690.0, filed with the China National Intellectual Property Administration on Jul. 23, 2021 and entitled "HIERARCHICAL QUERY METHODS AND APPARATUSES", which is incorporated herein by reference in its entirety.

This specification claims priority to Chinese Patent Application No. 202110834690.0, filed with the China National Intellectual Property Administration on Jul. 23, 2021 and entitled "HIERARCHICAL QUERY METHODS AND APPARATUSES", which is incorporated herein by reference in its entirety.

TECHNICAL FIELD

One or more embodiments of this specification relate to the computer field, and in particular, to hierarchical query methods and apparatuses.

BACKGROUND

A plurality of pieces of service data in a database table may have a hierarchical relationship, and a corresponding hierarchical query request can be initiated for the database table to obtain a tree structure formed by using the pieces of data in the database table as nodes. In the hierarchical query request, a query start condition for querying data from the database table can be defined, and the query start condition is used to describe a condition that data of a root node of the to-be-obtained tree structure should satisfy. In the hierarchical query request, a connection condition can be further defined, and the connection condition is used to describe a relationship that should be satisfied by data used as a parent node and data used as a child node in the to-be-obtained tree structure.

Generally, it takes a relatively long time to process the hierarchical query request, and efficiency is relatively low.

SUMMARY

One or more embodiments of this specification provide hierarchical query methods and apparatuses, to process a hierarchical query request more efficiently.

According to a first aspect, a hierarchical query method is provided. The method is used to process a hierarchical query request for requesting to query a target database table, and the hierarchical query request includes a query start condition and a connection condition. The method includes following: In a first query round, first data is queried from the target database table based on the query start condition, and the first data is used as a root node of a tree structure; a plurality of pieces of service data in the target database table are grouped into N data groups corresponding to N worker threads based on the connection condition, where N is an integer greater than 1; and in an $i^{th}$ query round greater than 1, a leaf node in the current tree structure is selected as a parent node; a target worker thread corresponding to the parent node is determined from the N worker threads based on the connection condition, so that the target worker thread queries second data from the data group corresponding to the target worker thread based on the parent node and the connection condition; and the second data is used as a child node of the parent node.

In a possible implementation, that a plurality of pieces of service data in the target database table are grouped into N data groups corresponding to N worker threads based on the connection condition includes following: Whether the connection condition is an equivalence condition is determined, where the equivalence condition is used to indicate that a field value of a first field in a child node is the same as a field value of a second field in a parent node; and the plurality of pieces of service data are grouped into the N data groups corresponding to the N worker threads based on field values of first fields in the plurality of pieces of service data when the connection condition is the equivalence condition. That a target worker thread corresponding to the parent node is determined from the N worker threads based on the connection condition includes following: The target worker thread corresponding to the parent node is determined from the N worker threads based on the field value of the second field in the parent node when the connection condition is the equivalence condition.

In a possible implementation, that the plurality of pieces of service data are grouped into the N data groups corresponding to the N worker threads based on field values of first fields in the plurality of pieces of service data specifically includes following: Hash values of the field values of the first fields in the plurality of pieces of service data are determined, a first modulo operation is performed on the hash values by using N, and the plurality of pieces of service data are grouped into the N data groups corresponding to the N worker threads based on a result of the first modulo operation. That the target worker thread corresponding to the parent node is determined from the N worker threads based on the field value of the second field in the parent node specifically includes following: A hash value of the field value of the second field in the parent node is determined, a second modulo operation is performed on the hash value by using N, and the target worker thread corresponding to the parent node is determined from the N worker threads based on a result of the second modulo operation.

In a possible implementation, that a plurality of pieces of service data in the target database table are grouped into N data groups corresponding to N worker threads based on the connection condition includes following: Whether the connection condition is an equivalence condition is determined, where the equivalence condition is used to indicate that a field value of a first field in a child node is the same as a field value of a second field in a parent node; and the plurality of pieces of service data are grouped into the N data groups corresponding to the N worker threads based on the total quantity N of the N worker threads when the connection condition is not the equivalence condition. That a target worker thread corresponding to the parent node is determined from the N worker threads based on the connection condition includes following: The N worker threads are determined as the target worker threads corresponding to the parent node when the connection condition is not the equivalence condition.

In a possible implementation, the method further includes following: A path corresponding to the root node and the parent node in the current tree structure is determined. That the second data is used as a child node of the parent node specifically includes following: The second data is used as the child node of the parent node in the current tree structure when the path does not include the second data.

According to a second aspect, another hierarchical query method is provided. The method is used to process a hierarchical query request for requesting to query a target database table, and the hierarchical query request includes a query start condition and a connection condition. The method includes following: In a first query round, third data is queried from the target database table based on the query start condition, and the third data is used as a root node of a tree structure; a plurality of pieces of service data in the target database table are grouped into N data groups corresponding to N worker threads based on the connection condition, where N is an integer greater than 1; and in an $i^{th}$ query round greater than 1, current worker threads in the N worker threads obtain several pieces of fourth data corresponding to the current worker threads, where the fourth data belongs to third data found in an $(i-1)^{th}$ query round; and the current worker thread queries, based on the connection condition, third data to be used as a child node of the fourth data from the data group corresponding to the current worker thread.

In a possible implementation, the method further includes following: The current worker thread determines a target worker thread corresponding to the third data to be used as the child node from the N worker threads, and provides the third data to be used as the child node to the target worker thread, where in an $(i+1)^{th}$ query round, the third data to be used as the child node belongs to fourth data corresponding to the target worker thread.

In a possible implementation, that a plurality of pieces of service data in the target database table are grouped into N data groups corresponding to N worker threads based on the connection condition includes following: Whether the connection condition is an equivalence condition is determined, where the equivalence condition is used to indicate that a field value of a first field in a child node is the same as a field value of a second field in a parent node; and the plurality of pieces of service data are grouped into the N data groups corresponding to the N worker threads based on field values of first fields in the plurality of pieces of service data when the connection condition is the equivalence condition. That the current worker thread determines a target worker thread corresponding to the third data to be used as the child node from the N worker threads includes following: The current worker thread determines the target worker thread corresponding to the third data to be used as the child node from the N worker threads based on a field value of a second field in the third data to be used as the child node.

In a possible implementation, that the plurality of pieces of service data are grouped into the N data groups corresponding to the N worker threads based on field values of first fields in the plurality of pieces of service data specifically includes following: Hash values of the field values of the first fields in the plurality of pieces of service data are determined, a first modulo operation is performed on the hash values by using N, and the plurality of pieces of service data are grouped into the N data groups corresponding to the N worker threads based on a result of the first modulo operation. That the current worker thread determines the target worker thread corresponding to the third data to be used as the child node from the N worker threads based on a field value of a second field in the third data to be used as the child node specifically includes following: The current worker thread determines a hash value of the field value of the second field in the third data to be used as the child node, a second modulo operation is performed on the hash value by using N, and the target worker thread corresponding to the third data to be used as the child node is determined from the N worker threads based on a result of the second modulo operation.

In a possible implementation, that a plurality of pieces of service data in the target database table are grouped into N data groups corresponding to N worker threads based on the connection condition includes following: Whether the connection condition is an equivalence condition is determined, where the equivalence condition is used to indicate that a field value of a first field in a child node is the same as a field value of a second field in a parent node; and the plurality of pieces of service data are grouped into the N data groups corresponding to the N worker threads based on the total quantity N of the N worker threads when the connection condition is not the equivalence condition. That a target worker thread corresponding to the third data to be used as the child node is determined includes following: The N worker threads are determined as the target worker threads corresponding to the third data to be used as the child node.

In a possible implementation, the method further includes following: The current worker thread obtains a path corresponding to the root node and the fourth data in the tree structure. That the current worker thread queries, based on the connection condition, third data to be used as a child node of the fourth data from the data group corresponding to the current worker thread includes following: The current worker thread queries candidate data from the data group corresponding to the current worker thread based on the connection condition; and the candidate data is determined as the third data to be used as the child node of the fourth data when the path does not include the candidate data.

In a possible implementation, the method further includes following: The current worker thread sends, to a coordinator thread, an $(i-1)^{th}$ piece of end information indicating that the current worker thread completes the $i^{th}$ query round; and when determining that the coordinator thread receives the $(i-1)^{th}$ piece of end information from the N worker threads, the coordinator thread separately sends, to the N worker threads, start information indicating the N worker threads to perform the $(i+1)^{th}$ query round.

In a possible implementation, the method further includes following: The third data to be used as the child node is used as the child node of the fourth data in the current tree structure.

According to a third aspect, a hierarchical query apparatus is provided. The apparatus is configured to process a hierarchical query request for requesting to query a target database table, and the hierarchical query request includes a query start condition and a connection condition. The apparatus includes: a first query unit, configured to: in a first query round, query first data from the target database table based on the query start condition, and use the first data as a root node of a tree structure; a group management unit, configured to group a plurality of pieces of service data in the target database table into N data groups corresponding to N worker threads based on the connection condition, where N is an integer greater than 1; and a second query unit, configured to: in an $i^{th}$ query round greater than 1, select a leaf node in the current tree structure as a parent node; determine a target worker thread corresponding to the parent node from the N worker threads based on the parent node and the connection condition, so that the target worker thread queries second data from the data group corresponding to the target worker thread based on the connection condition; and use the second data as a child node of the parent node.

According to a fourth aspect, another hierarchical query apparatus is provided. The apparatus is configured to process a hierarchical query request for requesting to query a target database table, and the hierarchical query request includes a query start condition and a connection condition. The apparatus includes: a third query unit, configured to: in a first query round, query third data from the target database table based on the query start condition, and use the third data as a root node of a tree structure; a group management unit, configured to group a plurality of pieces of service data in the target database table into N data groups corresponding to N worker threads based on the connection condition, where N is an integer greater than 1; and a fourth query unit, configured to: in an $i^{th}$ query round greater than 1, obtain, by current worker threads in the N worker threads, several pieces of fourth data corresponding to the current worker threads, where the fourth data belongs to third data found in an $(i-1)^{th}$ query round; and query, by the current worker thread based on the fourth data and the connection condition, third data to be used as a child node of the fourth data from the data group corresponding to the current worker thread.

According to a fifth aspect, a computer-readable storage medium is provided. The computer-readable storage medium stores a computer program/instructions, and when the computer program/instructions are executed in a computing device, the computing device performs the method according to either of the first aspect or the second aspect.

According to a sixth aspect, a computing device is provided, including a memory and a processor. The memory stores a computer program/instructions, and the processor executes the computer program/instructions to implement the method according to either of the first aspect or the second aspect.

According to the methods and the apparatuses provided in the one or more embodiments of this specification, in a single query round, a single worker thread can query a small amount of service data in a data group corresponding to the single worker thread, or N worker threads can query small amounts of service data in data groups respectively corresponding to the N worker threads in parallel, to quickly find all service data used as child nodes of a determined node in a tree structure. Alternatively, in a single query round, one or more of N worker threads can respectively query small amounts of service data in data groups corresponding to the one or more worker threads, to quickly find child nodes of all leaf nodes at the same layer in a tree structure. As such, time of processing a hierarchical query request can be reduced, and efficiency of processing the hierarchical query request can be improved.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can still derive other drawings from these accompanying drawings without creative efforts.

DESCRIPTION OF EMBODIMENTS

The following describes in detail unlimited embodiments provided in this specification with reference to the accompanying drawings.

A hierarchical query request corresponds to a hierarchical query statement, for example, the hierarchical query request can include a hierarchical query statement or can be parsed into a hierarchical query statement. In the hierarchical query statement, a query start condition can be defined by using, for example, a "start with" clause, and a connection condition can be defined by using, for example, a "connect by" clause. Processing a hierarchical query request for requesting to query a target database table essentially includes following: First, service data used as a root node of a tree structure is determined from the target database table based on a query start condition; then, other service data is queried from the target database table based on a connection condition; and finally, the tree structure using the service data as nodes is obtained.

For example, for a target database table t shown in the following Table 1, where for example, the target database tablet is a company employee information table, in the target database table t, service data in a single row represents one piece of employee information, a field value of an id field is an identity allocated by an enterprise/organization to an employee, where the identity can be a value or a string; a field value of a mgr_id field is an identity of a leader assigned by the enterprise/organization to the employee; and a field value of a name field is a name of the employee.

TABLE 1

| id | mgr_id | name |
|---|---|---|
| 0 | −1 | A |
| 1 | 0 | B |
| 2 | 0 | C |
| 3 | 0 | D |
| 4 | 1 | E |
| 5 | 1 | F |
| 6 | 1 | G |
| 7 | 2 | H |
| 8 | 2 | I |

Figure 1:
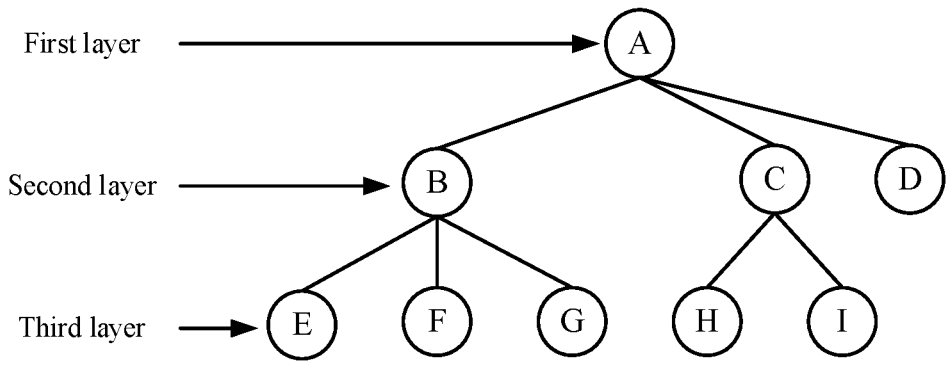
FIG. 1 is a schematic diagram illustrating an example tree structure, according to one or more embodiments of this specification.

When a hierarchical query request corresponding to a hierarchical query statement "select * from t start with id=0 connect by prior id=mgr_id" is received, a tree structure shown in FIG. 1 can be obtained. In FIG. 1, the field value of the name field in single service data is used to represent a location of a node corresponding to the service data in the tree structure.

In a possible implementation, the hierarchical query request can be processed by using a single-threaded serial processing method. In a process of processing the hierarchical query request, for each node in the determined tree structure, all service data in the target database table needs to be queried to find all service data that may be used as child nodes of the node. In addition, after a child node of one node is queried, a child node of another node can continue to be queried. As such, time consumed for processing the hierarchical query request is relatively long, and efficiency is relatively low.

Figure 2:
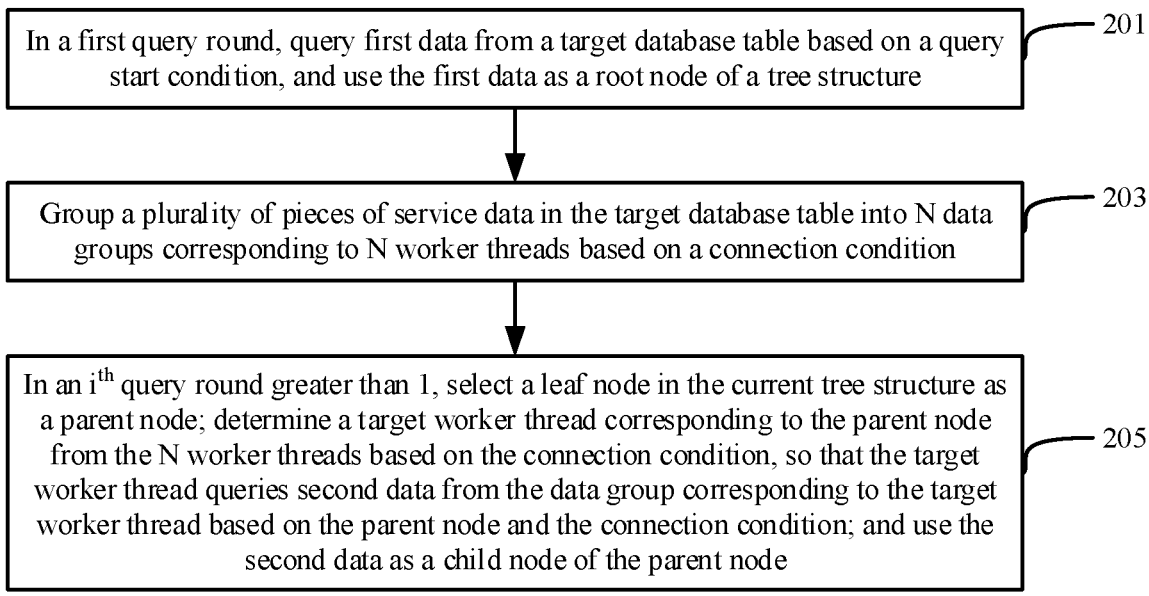
FIG. 2 is a flowchart illustrating a hierarchical query method, according to one or more embodiments of this specification.

To shorten time of processing a hierarchical query request and improve efficiency of processing the hierarchical query request, one or more embodiments of this specification provide a hierarchical query method. The method is used to process a hierarchical query request for requesting to query a target database table, where the hierarchical query request includes a query start condition and a connection condition. As shown in FIG. 2, the hierarchical query method provided in the one or more embodiments of this specification can include at least the following steps: Step 201: In a first query round, query first data from the database table based on the query start condition, and use the first data as a root node of a tree structure. Step 203: Group a plurality of pieces of service data in the target database table into N data groups corresponding to N worker threads, where N is an integer greater than 1. Step 205: In an $i^{th}$ query round with i being greater than 1, select a leaf node in the current tree structure as a parent node; determine a target worker thread corresponding to the parent node from the N worker threads based on the connection condition, so that the target worker thread queries second data from the data group corresponding to the target worker thread based on the parent node and the connection condition; and use the second data as a child node of the parent node.

In the method shown in FIG. 2, all other processing other than processing explicitly needed to be performed by the target worker thread can be performed by one or more other threads other than the N worker threads. That a primary thread executes other processing is mainly used as an example below to describe in detail the steps in the method shown in FIG. 2.

First, in step 201, in the first query round, the first data is queried from the target database table based on the query start condition, and the first data is used as the root node of the tree structure.

The query start condition in the hierarchical query request is used to describe a condition that service data used as the root node should satisfy. For example, for the target database table t in Table 1, single service data is represented by using the field value of the name field in the service data. If in the hierarchical query request, the query start condition limited by a "start with" clause is "id=0", that is, the "start with" clause limits a field value of an id field in the service data used as the root node to 0, in step 201, it can be specifically found by the primary thread from the target database table t that the first data whose id field has a field value 0 is service A, and then service data A is used as the root node of the tree structure expected to be obtained.

Next, in step 203, the plurality of pieces of service data in the target database table are grouped into the N data groups corresponding to the N worker threads based on the connection condition, where N is an integer greater than 1.

The total quantity N of worker threads can be configured with reference to an actual service requirement. To facilitate clear and accurate description of the technical solution provided in the one or more embodiments of this specification, that a value of Nis 5 is mainly used as an example below for description.

Connection conditions usually can be divided into two types: an equivalence condition and a non-equivalence condition. A connection condition belonging to the equivalence condition is used to indicate that a field value of a first field in a child node is the same as a field value of a second field in a parent node, and the first field and the second field can also represent connection keys of the parent node and the child node. For example, in the hierarchical query request, a "connect by" clause can be used to describe that the connection condition belongs to the equivalence condition, that is, "prior id=mgr_id", which indicates that a field value of an id field (that is, the second field) in the parent node is the same as a field value of a mgr_id field (that is, the first field) in the child node. Corresponding to the equivalence condition, another connection condition that does not belong to the equivalence condition belongs to the non-equivalence condition. For example, in the hierarchical query request, a "connect by" clause can be used to describe that the connection condition belongs to the non-equivalence condition, that is, "prior id<mgr_id", which indicates that the field value of the id field in the parent node is less than the field value of the mgr_id field in the child node.

Figure 3:
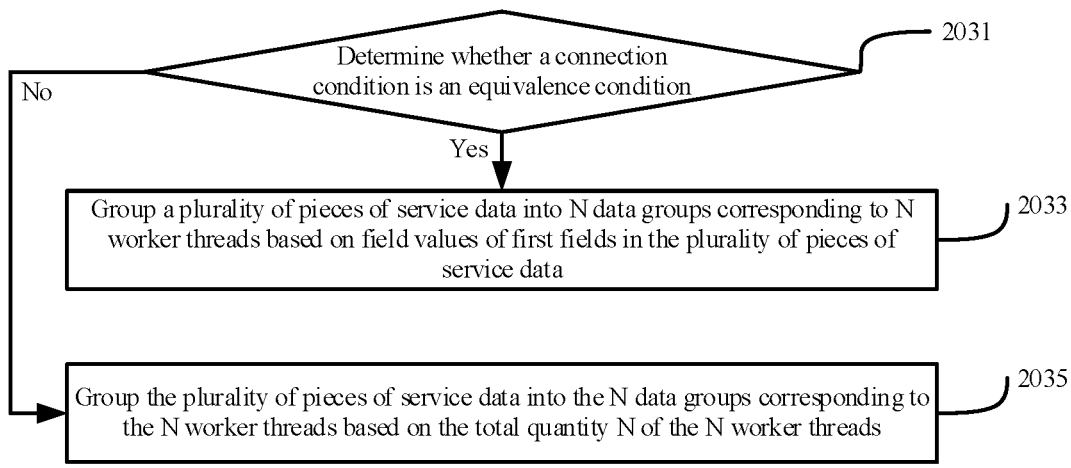
FIG. 3 is a schematic diagram illustrating a method for grouping service data, according to one or more embodiments of this specification.

In step 203, the plurality of pieces of service data in the target database table can be grouped into the N data groups corresponding to the N worker threads in different ways based on different types of connection conditions. Specifically, referring to FIG. 3, step 203 can specifically include the following step 2031 to step 2035.

Step 2031: Determine whether the connection condition is an equivalence condition.

If the connection condition is the equivalence condition, step 2033 is performed; otherwise, step 2035 is performed.

Step 2033: Group the plurality of pieces of service data into the N data groups corresponding to the N worker threads based on field values of first fields in the plurality of pieces of service data.

The primary thread can first determine hash values of the field values of the first fields in the service data, then perform a first modulo operation on the hash values by using the total quantity N of the N worker threads, and further group the plurality of pieces of service data into the N data groups corresponding to the N worker threads based on a result of the first modulo operation. For example, for single service data, the primary thread can first determine a hash value of a field value of a first field in the service data, then perform a modulo operation on the hash value by using the total quantity N of the N worker threads to obtain a value k1, and further group the service data into a data group corresponding to a $(k1+1)^{th}$ worker thread in the N worker threads. When the hash value of the field value of the first field in the service data is determined, a predetermined algorithm specifically used usually needs to satisfy a specific condition, for example, satisfy the following condition: a hash value obtained by processing the field value (a value or a string) of the first field by the predetermined algorithm is an integer. Therefore, it is not difficult to understand that, when the field value of the first field in the service data is an integer, the hash value of the field value of the first field in the single service data can be the field value. Alternatively, the hash value of the field value of the first field in the service data may not need to be obtained, and instead, a modulo operation is directly performed on the field value of the first field by using the total quantity N of the N worker threads to obtain the value k1, and the service data is grouped into the data group corresponding to the $(k1+1)^{th}$ worker thread in the N worker threads.

That the corresponding field value of the first field in the service data is an integer and the hash value of the field value obtained by using the predetermined algorithm f(x) is the field value is specifically used as an example below to describe the technical solution provided in the one or more embodiments of this specification.

The N worker threads include five worker threads arranged in sequence: worker 1 to worker 5. For the target database table t illustrated in Table 1, when the query start condition in the hierarchical query request is "id=0" and the connection condition is "prior id-mgr_id", grouping of service data B to service data I is shown in the following Table 2.

TABLE 2

| Worker thread | Data group |
| --- | --- |
| worker 1 | B, C, and D |
| worker 2 | E, F, and G |
| worker 3 | H and I |
| worker 4 | Null |
| worker 5 | A |

Referring to the previous Table 1 and Table 2, hash values of the field values 0 of the mgr_id fields in service data B, C, and D determined by using the predetermined algorithm F(x) are 0, and a value k1 obtained by performing a modulo operation on the hash value 0 by using the total quantity 5 of the N worker threads is 0. Therefore, service data B, C, and D can be grouped into a data group corresponding to a first worker thread worker 1. Similarly, service data A can be grouped into a data group corresponding to a fifth worker thread worker 5, service data E, F, and G can be grouped into a data group corresponding to a second worker thread worker 2, and service data H and I can be grouped into a data group corresponding to a third worker thread worker 3. For worker 4, service data A to I are not grouped into a data group corresponding to worker 4. Therefore, in Table 2, service data in the data group corresponding to worker 4 is marked as "Null".

Step 2035: Group the plurality of pieces of service data into the N data groups corresponding to the N worker threads based on the total quantity N of the N worker threads.

For M pieces of service data included in the target database table, the M pieces of service data can be evenly grouped into the N data groups corresponding to the N worker threads as much as possible based on the total quantity N of worker threads. For example, if N is divisible by M, an amount of service data in a single group can be M/N; or if N is not divisible by M, an amount of service data in a single group can be obtained by rounding up or rounding down M/N.

Returning to FIG. 2, in step 205, in the $i^{th}$ query round greater than 1, the leaf node in the current tree structure is selected as the parent node; the target worker thread corresponding to the parent node is determined from the N worker threads based on the connection condition, so that the target worker thread queries the second data from the data group corresponding to the target worker thread based on the parent node and the connection condition; and the second data is used as the child node of the parent node.

In a second query round, because the current tree structure includes only the root node, the root node is also the leaf node of the current tree structure. In a query round greater than 2, the leaf node selected by the primary thread from the current tree structure can be any leaf node that has not been selected from the current tree structure.

How to determine the target worker thread corresponding to the parent node from the N worker threads based on the connection condition is also dependent on a type of the connection condition. In addition, it is worthwhile to specially note that, when the type of the connection condition is the equivalence condition, a method for determining the target worker thread corresponding to the parent node from the N worker threads needs to be similar to the previous method for grouping the plurality of pieces of data in the target database table into the data groups corresponding to the N worker threads, to ensure that the data group corresponding to the target worker thread completely includes all service data that may be used as child nodes of the parent node.

In a relatively specific example, when the connection condition is the equivalence condition, similar to that the plurality of pieces of data in the target database table are grouped into the data groups corresponding to the N worker threads, the target worker thread corresponding to the parent node can be determined from the N worker threads based on the field value of the second field in the parent node. In a more specific example, a hash value of the field value of the second field in the parent node can be first determined, a second modulo operation is performed on the hash value by using N, and the target worker thread corresponding to the parent node is determined from the N worker threads based on a result of the second modulo operation.

That the processed hierarchical query request corresponds to the hierarchical query statement "select * from t start with id=0 connect by prior id=mgr_id" continues to be used as an example below. For the case that the plurality of pieces of service data in the target database table t are grouped into the N data groups, references can continue to be made to the previous Table 2.

In the second query round, root node A (that is, service data A) in the current tree structure is used as the parent node, the field value of the id field in service data A is 0, a hash value of the field value 0 of the id field in service data A determined by using the predetermined algorithm F(x) is 0, and a value k1 obtained by performing a modulo operation on the hash value 0 by using the total quantity 5 of the N worker threads is 0. Therefore, the primary thread can determine the first worker thread worker 1 as the target worker thread corresponding to service data A, and transfer service data A to worker 1. Next, worker 1 can query service data B, C, and D that may be used as child nodes of service data A from the data group corresponding to worker 1, and then return service data B, C, and D to the primary thread based on the connection condition "prior id=mgr_id". Then, the primary thread can update the current tree structure by using service data B, C, and D from worker 1 as the child nodes of service data A in the current tree structure.

In a third query round, leaf nodes in the current tree structure include service data B, C, and D. The primary thread can randomly select service data from service data B, C, and D as the parent node, for example, select service data B as the parent node. Through a process similar to that in the second query round, the primary thread can determine that the target worker thread corresponding to service data B is worker 2. Worker 2 can find service data E, F, and G that may be used as child nodes of service data B from the data group corresponding to worker 2. Further, the primary thread updates the current tree structure by using service data E, F, and G that are found by worker 2 as the child nodes of service data B in the current tree structure.

For other query rounds greater than 3, leaf nodes located at a plurality of different layers may exist in the current tree structure. With reference to FIG. 1, after the third query round is completed and service data E, F, and G are used as leaf nodes of service data B, in a fourth query round, leaf nodes in the current tree structure can include service data C and service data D that are located at a second layer, and further include service data E, F, and G that are located at a third layer. For other query rounds greater than 3, a leaf node can be selected from a lowest layer of the tree structure as the parent node based on a depth-first-search rule, or a leaf node is randomly selected from layers as the parent node.

When the connection condition is the equivalence condition, the target worker thread can specifically use any one of a plurality of methods such as "merge join", "nested loop join", and "hash join" to query the second data from the data group corresponding to the target worker thread based on the parent node and the connection condition. Generally, "hash join" is an optimal method. A single worker thread can construct a hash table for service data in a data group corresponding to the single worker thread when querying the second data from the data group corresponding to the single worker thread for the first time. Afterwards, each time the second data is queried from the data group corresponding to the single worker thread, only a hash value of a corresponding parent node needs to be matched with a hash value in the hash table to obtain the second data that may be used as a child node of the corresponding parent node.

In a relatively specific example, when the connection condition is the non-equivalence condition, because the plurality of pieces of service data can be randomly grouped into the N data groups corresponding to the N worker threads, the primary thread can determine all the N worker threads as the target worker threads corresponding to the parent node, so that the N worker threads query all second data that may be used as child nodes of the parent node from the data groups respectively corresponding to the N worker threads, and the primary thread uses, as the child nodes of the parent node in the current tree structure, all the second data that is jointly found by the N worker threads and that is to be used as the child nodes of the parent node.

In some embodiments, in a single query round, a path corresponding to the parent node and the root node in the tree structure can also be determined. After the target worker thread finds the second data that may be used as the child node of the parent node, the primary thread determines whether the path already includes the second data, and uses the second data found by the target worker thread as the child node of the parent node only when the path does not include the second data. As such, a ring structure is avoided in an updated tree structure.

According to the hierarchical query method provided in the one or more embodiments shown in FIG. 2, when a hierarchical query request is processed, in a single query round, a single worker thread can query a small amount of service data in a data group corresponding to the single worker thread, or N worker threads can query small amounts of service data in data groups respectively corresponding to the N worker threads in parallel, to quickly find all service data used as child nodes of a determined node in a tree structure, thereby shortening time of processing the hierarchical query request and improving efficiency of processing the hierarchical query request.

Figure 4:
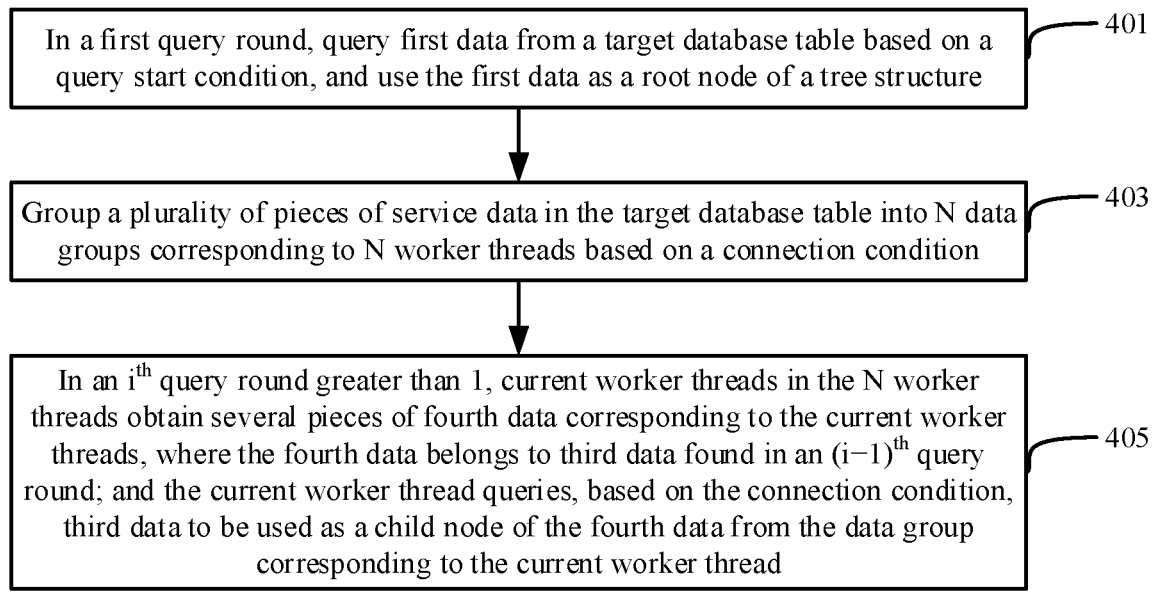
FIG. 4 is a schematic diagram illustrating another hierarchical query method, according to one or more embodiments of this specification.

To shorten time of processing a hierarchical query request and improve efficiency of processing the hierarchical query request, one or more embodiments of this specification provide another hierarchical query method. The method is used to process a hierarchical query request for requesting to query a target database table, where the hierarchical query request includes a query start condition and a connection condition. As shown in FIG. 4, the another hierarchical query method provided in the one or more embodiments of this specification can include at least the following steps: Step 401: In a first query round, query third data from the target database table based on the query start condition, and use the third data as a root node of a tree structure. Step 403: Group a plurality of pieces of service data in the target database table into N data groups corresponding to N worker threads based on the connection condition, where N is an integer greater than 1. Step 405: In an $i^{th}$ query round greater than 1, current worker threads in the N worker threads obtain several pieces of fourth data corresponding to the current worker threads, where the fourth data belongs to third data found in an $(i-1)^{th}$ query round; and the current worker thread queries, based on the connection condition, third data to be used as a child node of the fourth data from the data group corresponding to the current worker thread.

In the method shown in FIG. 4, all other processing other than processing explicitly needed to be performed by one or more of the N worker threads can be performed by one or more other threads other than the N worker threads. That a primary thread executes other processing is mainly used as an example below to describe in detail the steps in the method shown in FIG. 4.

Processing performed in step 401 and step 403 is the same as processing performed in step 201 and step 203 in the one or more embodiments shown in FIG. 2. Therefore, for the processing performed in step 401 and step 403, references can be made to related descriptions of step 201 and step 203. The following focuses on description of step 405 different from that in the one or more embodiments shown in FIG. 2.

In step 405, in the $i^{th}$ query round greater than 1, the current worker threads in the N worker threads obtain several pieces of fourth data corresponding to the current worker threads, where the fourth data belongs to the third data found in the $(i-1)^{th}$ query round; and the current worker thread queries, based on the connection condition, the third data to be used as the child node of the fourth data from the data group corresponding to the current worker thread.

In a single query round greater than 1, all of the N worker threads can collaborate with each other to find child nodes of all leaf nodes located at the same layer in the current tree structure. When query rounds are different, methods used by the N worker threads to respectively obtain several pieces of fourth data corresponding to the N worker threads are different.

In a second query round, the primary thread can determine a target worker thread corresponding to the third data used as the root node from the N worker threads, and transfer the third data used as the root node to the target worker thread. In other words, in the second query round, the current worker threads in the N worker threads can receive the fourth data corresponding to the worker threads from the primary thread, where the fourth data is the third data found in the first query round and used as the root node.

In a relatively specific example, when the connection condition is an equivalence condition, similar to that the plurality of pieces of data in the target database table are grouped into the data groups corresponding to the N worker threads, the primary thread can determine the target worker thread corresponding to the third data used as the root node from the N worker threads based on a field value of a second field in the third data used as the root node. In a more specific example, the primary thread can first determine a hash value of the field value of the second field in the third data used as the root node, perform a modulo operation on the hash value by using N, and determine the target worker thread corresponding to the third data used as the root node from the N worker threads based on a result of the modulo operation.

That the processed hierarchical query request corresponds to the hierarchical query statement "select * from t start with id=0 connect by prior id=mgr_id" continues to be used as an example. For the case that the plurality of pieces of service data in the target database table t are grouped into the N data groups, references can continue to be made to the previous Table 2. In the second query round, the field value of the id field (that is, the second field) in service data A used as the root node is 0, a hash value of the field value 0 of the id field in service data A determined by using the predetermined algorithm F(x) is 0, and a value k1 obtained by performing a modulo operation on the hash value 0 by using the total quantity 5 of the N worker threads is 0. Therefore, the primary thread can determine the first worker thread worker 1 as the target worker thread corresponding to service data A, and transfer service data A to worker 1. As such, in the second query round, the fourth data obtained by worker 1 in the N worker threads can include service data A from the primary thread, and worker 2, worker 3, worker 4, and worker 5 other than worker 1 in the N worker threads cannot obtain the fourth data corresponding to the worker 2, worker 3, worker 4, and worker 5. Therefore, in the second query round, worker 1 finds, from the data group corresponding to worker 1, that third data to be used as a child node of service data A specifically includes service data B, service data C, and service data D.

In a relatively specific example, when the connection condition is a non-equivalence condition, the plurality of pieces of service data can be randomly grouped into the N data groups corresponding to the N worker threads. Therefore, the primary thread can determine all the N worker threads as the target worker threads corresponding to the third data used as the root node. In other words, in the two query rounds, the fourth data that is obtained by each of the N worker threads and that corresponds to the worker thread is the third data that is from the primary thread and that has been used as the root node.

In a query round greater than 2, a single worker thread can receive several pieces fourth data corresponding to the worker thread from another worker thread in the N worker threads. Specifically, in the $i^{th}$ query round greater than 1, after finding the third data to be used as the child node of the fourth data, the single worker thread can further determine the target worker thread corresponding to the third data, and then transfer the third data to the target worker thread. The third data belongs to fourth data obtained by the target worker thread in an $(i+1)^{th}$ query round. The method used by the single worker thread to determine the target worker thread corresponding to the third data to be used as the child node of the fourth data is the same as or similar to the previous method used by the primary thread to determine the target worker thread corresponding to the third data used as the root node from the N worker threads.

Figure 5:
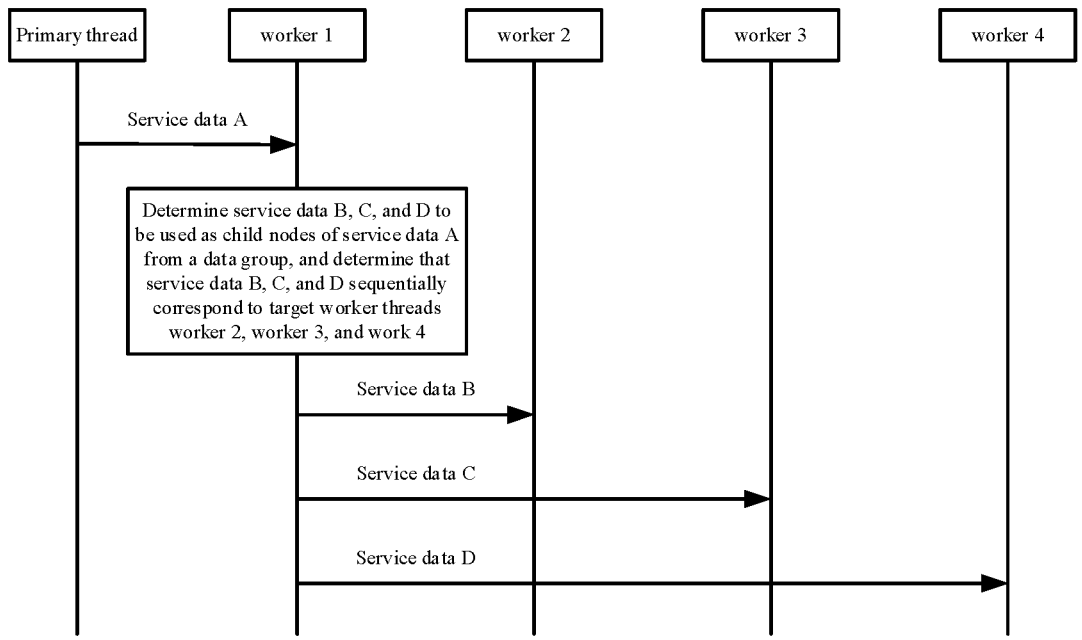
FIG. 5 is a schematic diagram illustrating obtaining service data of a to-be-queried child node by a worker thread, according to one or more embodiments of this specification.

For example, referring to FIG. 5, in the second query round, for service data A from the primary thread, worker 1 determines that the third data to be used as the child node of service data A includes service data B, service data C, and service data D. Next, worker 1 determines that the target worker thread corresponding to service data B is worker 2, the target worker thread corresponding to service data C is worker 3, and the target worker thread corresponding to service data D is worker 4. Therefore, worker 1 can send service data B to worker 2, send service data C to worker 3, and send service data D to worker 4. Correspondingly, in a third query round, fourth data obtained by worker 2 includes service data B from worker 1, and it is found from the data group corresponding to worker 2 that third data to be used as a child node of service data B includes service data E, service data F, and service data G. Fourth data obtained by worker 3 includes service data C from worker 1, and it is found from the data group corresponding to worker 3 that third data to be used as a child node of service data C includes service data H and service data I. Fourth data obtained by worker 4 includes service data D from worker 1, and third data to be used as a child node of service data D cannot be found from the data group corresponding to worker 4.

In a possible implementation, in the $i^{th}$ query round greater than 1, a single worker thread can further obtain a path corresponding to the root node and the fourth data corresponding to the root node in the current tree structure. For example, the path is from another worker thread that sends the fourth data to the worker thread. Correspondingly, the worker thread can specifically query candidate data that may be used as a child node of the fourth data from the data group corresponding to the worker thread based on the connection condition. When the path does not include the candidate data, it indicates that a path corresponding to the root node and the candidate data in the to-be-formed tree structure does not form a ring structure. In this case, the candidate data can be determined as the third data to be used as the child node of the fourth data.

In a possible implementation, in the $i^{th}$ query round greater than 1, the primary thread can further update the current tree structure by using the third data found by the worker threads as child nodes of the corresponding fourth data in the current tree structure. For example, in the second query round, worker 2 can return service data B, C, and D to be used as the child nodes of service data A to the primary thread, and the primary thread can use service data B, C, and D as the child nodes of service data A in the current tree structure. In the third query round, worker 3 can return service data E, F, and G to be used as the child nodes of service data B to the primary thread, and worker 4 can return service data H and I to be used as the child nodes of service data C to the primary thread. In the current tree structure, the primary thread can use service data E, F, and G as the child nodes of service data B, and use service data H and I as the child nodes of service data C.

In a possible implementation, in the $i^{th}$ query round greater than 1, when a single worker thread finds the third data to be used as the child node of the fourth data from the data group corresponding to the single worker thread, or cannot find the third data to be used as the child node of the fourth data from the data group corresponding to the single worker thread, the worker thread can further send, to a coordinator thread, an $(i-1)^{th}$ piece of end information indicating that the single worker thread completes the $i^{th}$ query round. Correspondingly, when determining that the coordinator thread receives the $(i-1)^{th}$ piece of end information from the N worker threads, the coordinator thread can separately send, to the N worker threads, start information indicating the N worker threads to perform the $(i+1)^{th}$ query round. It is worthwhile to note that the coordinator thread can be, for example, the primary thread. When the worker thread does not obtain the fourth data corresponding to the worker thread in the $(i+1)^{th}$ query round, the worker thread can still receive the start information from the coordinator thread. In this case, the worker thread can directly return, to the coordinator thread, an $i^{th}$ piece of end information indicating that the worker thread completes the $(i+1)^{th}$ query round. The $(i-1)^{th}$ piece of end information sent by the single worker thread to the primary thread and the third data that is returned by the worker thread to the primary thread in the $i^{th}$ query round and that is to be used as the child node of the fourth data can be sent to the primary thread together or can be separately sent to the primary thread.

According to the hierarchical query method provided in the one or more embodiments shown in FIG. 4, when a hierarchical query request is processed, in a single query round, one or more of the N worker threads can respectively query a small amount of service data in a data group corresponding to the one or more worker threads, to quickly find child nodes of all leaf nodes located at the same layer in a tree structure, thereby shortening time of processing the hierarchical query request and improving efficiency of processing the hierarchical query request.

Figure 6:
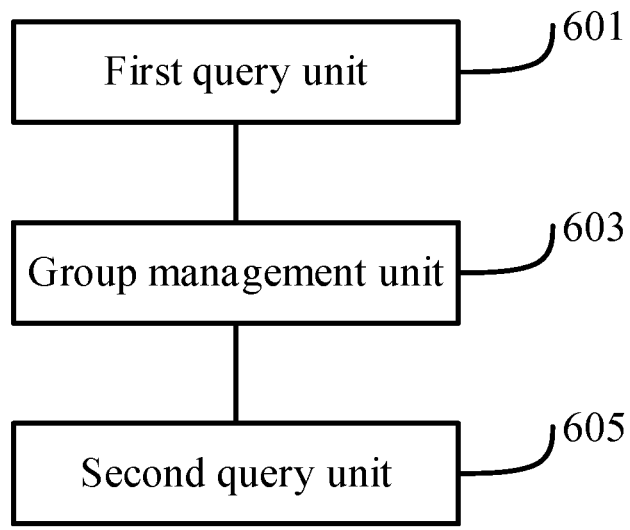
FIG. 6 is a schematic diagram illustrating a structure of a hierarchical query apparatus, according to one or more embodiments of this specification.

Based on the same concept as the previous method embodiments, one or more embodiments of this specification provide a hierarchical query apparatus, configured to process a hierarchical query request for requesting to query a target database table, where the hierarchical query request includes a query start condition and a connection condition. As shown in FIG. 6, the apparatus includes: a first query unit 601, configured to: in a first query round, query first data from the target database table based on the query start condition, and use the first data as a root node of a tree structure; a group management unit 603, configured to group a plurality of pieces of service data in the target database table into N data groups corresponding to N worker threads based on the connection condition, where N is an integer greater than 1; and a second query unit 605, configured to: in an $i^{th}$ query round greater than 1, select a leaf node in the current tree structure as a parent node; determine a target worker thread corresponding to the parent node from the N worker threads based on the parent node and the connection condition, so that the target worker thread queries second data from the data group corresponding to the target worker thread based on the connection condition; and use the second data as a child node of the parent node.

Figure 7:
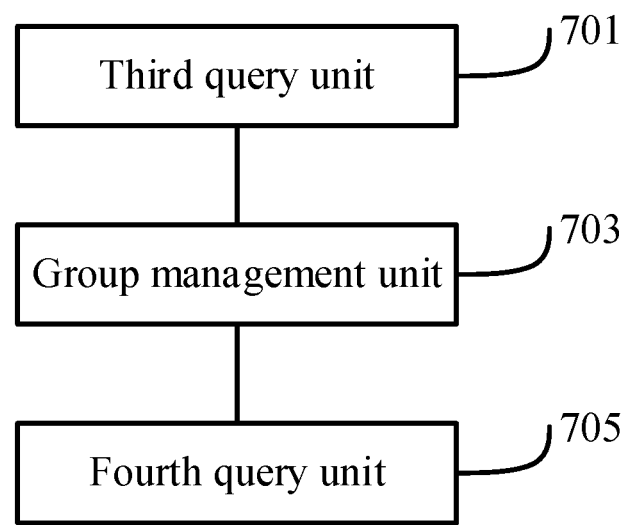
FIG. 7 is a schematic diagram illustrating a structure of another hierarchical query apparatus, according to one or more embodiments of this specification.

Based on the same concept as the previous method embodiments, one or more embodiments of this specification provide another hierarchical query apparatus, configured to process a hierarchical query request for requesting to query a target database table, where the hierarchical query request includes a query start condition and a connection condition. As shown in FIG. 7, the apparatus includes: a third query unit 701, configured to: in a first query round, query third data from the target database table based on the query start condition, and use the third data as a root node of a tree structure; a group management unit 703, configured to group a plurality of pieces of service data in the target database table into N data groups corresponding to N worker threads based on the connection condition, where N is an integer greater than 1; and a fourth query unit 705, configured to: in an $i^{th}$ query round greater than 1, obtain, by current worker threads in the N worker threads, several pieces of fourth data corresponding to the current worker threads, where the fourth data belongs to third data found in an $(i-1)^{th}$ query round; and query, by the current worker thread based on the fourth data and the connection condition, third data to be used as a child node of the fourth data from the data group corresponding to the current worker thread.

A person skilled in the art should be aware that in the previous one or more examples, functions described in this specification can be implemented by hardware, software, firmware, or any combination thereof. When software is used for implementation, a computer program corresponding to these functions can be stored in a computer-readable medium or transmitted as one or more instructions/code on the computer-readable medium, so that when the computer program corresponding to these functions is executed by a computer, the computer implements the hierarchical query method in any embodiment of this specification.

One or more embodiments of this specification further provide a computer-readable storage medium. The computer-readable storage medium stores a computer program, and when the computer program/instructions are executed in a computing device, the computing device performs the hierarchical query method provided in any of the embodiments of this specification.

One or more embodiments of this specification further provide a computing device, including a memory and a processor. The memory stores executable code, and when executing the executable code, the processor implements the hierarchical query method provided in any of the embodiments of this specification.

The embodiments in this specification are described in a progressive way. For same or similar parts of the embodiments, mutual references can be made to the embodiments. Each embodiment focuses on a difference from other embodiments. Particularly, the apparatus embodiments are basically similar to the method embodiments, and therefore are described briefly. For related parts, references can be made to related descriptions in the method embodiments.

Specific embodiments of this specification are described above. Other embodiments fall within the scope of the appended claims. In some cases, the actions or steps described in the claims can be performed in an order different from that in the embodiments, and the desired results can still be achieved. In addition, the processes depicted in the accompanying drawings do not necessarily need a specific order or a sequential order to achieve the desired results. In some implementations, multi-tasking and parallel processing are feasible or may be advantageous.

The objectives, technical solutions, and beneficial effects of this specification are further described in detail in the previous specific implementations. It should be understood that the previous descriptions are merely specific implementations of this specification, but are not intended to limit the protection scope of this specification. Any modification, equivalent replacement, or improvement made based on the technical solutions of this specification shall fall within the protection scope of this specification.

What is claimed is:

1. A hierarchical query method implemented to process a hierarchical query request for requesting to query a target database table, the hierarchical query request comprises a query start condition and a connection condition, and the method comprises:

in a first query round, querying first data from the target database table based on the query start condition, and using the first data as a root node of a tree structure;

grouping a plurality of pieces of service data in the target database table into N data groups corresponding to N worker threads based on the connection condition, wherein N is an integer greater than 1; and in an ith query round with i being greater than 1, selecting a leaf node in the current tree structure as a parent node; determining a target worker thread corresponding to the parent node from the N worker threads based on the connection condition, so that the target worker thread queries second data from the data group corresponding to the target worker thread based on the parent node and the connection condition; and using the second data as a child node of the parent node, wherein the grouping a plurality of pieces of service data in the target database table into N data groups corresponding to N worker threads based on the connection condition comprises: determining whether the connection condition is an equivalence condition, wherein the equivalence condition is used to indicate that a field value of a first field in a child node is the same as a field value of a second field in a parent node; and grouping the plurality of pieces of service data into the N data groups corresponding to the N worker threads based on field values of first fields in the plurality of pieces of service data upon determining that the connection condition is the equivalence condition; and the determining a target worker thread corresponding to the parent node from the N worker threads based on the connection condition comprises: determining the target worker thread corresponding to the parent node from the N worker threads based on the field value of the second field in the parent node upon determining that the connection condition is the equivalence condition.

2. The method according to claim 1, wherein
the grouping the plurality of pieces of service data into the N data groups corresponding to the N worker threads based on field values of first fields in the plurality of pieces of service data specifically comprises: determining hash values of the field values of the first fields in the plurality of pieces of service data, performing a first modulo operation on the hash values by using N, and grouping the plurality of pieces of service data into the N data groups corresponding to the N worker threads based on a result of the first modulo operation; and the determining the target worker thread corresponding to the parent node from the N worker threads based on the field value of the second field in the parent node specifically comprises: determining a hash value of the field value of the second field in the parent node, performing a second modulo operation on the hash value by using N, and determining the target worker thread corresponding to the parent node from the N worker threads based on a result of the second modulo operation.

3. The method according to claim 1, wherein
the grouping a plurality of pieces of service data in the target database table into N data groups corresponding to N worker threads based on the connection condition further comprises: grouping the plurality of pieces of service data into the N data groups corresponding to the N worker threads based on the total quantity N of the N worker threads upon determining that the connection condition is not the equivalence condition; and the determining a target worker thread corresponding to the parent node from the N worker threads based on the connection condition comprises: determining the N worker threads as the target worker threads corresponding to the parent node upon determining that the connection condition is not the equivalence condition.

4. The method according to claim 1, further comprising:
determining a path corresponding to the root node and the parent node in the current tree structure; and
the using the second data as a child node of the parent node specifically comprises: using the second data as the child node of the parent node in the current tree structure upon determining that the path does not comprise the second data.

5. A hierarchical query method implemented to process a hierarchical query request for requesting to query a target database table, the hierarchical query request comprises a query start condition and a connection condition, and the method comprises:

in a first query round, querying third data from the target database table based on the query start condition, and using the third data as a root node of a tree structure;

grouping a plurality of pieces of service data in the target database table into N data groups corresponding to N worker threads based on the connection condition, wherein N is an integer greater than 1; and in an ith query round with i being greater than 1, obtaining, by current worker threads in the N worker threads, several pieces of fourth data corresponding to the current worker threads, wherein the fourth data belongs to third data found in an (i−1)th query round; and querying, by the current worker thread based on the connection condition, third data to be used as a child node of the fourth data from the data group corresponding to the current worker thread, wherein the grouping a plurality of pieces of service data in the target database table into N data groups corresponding to N worker threads based on the connection condition comprises: determining whether the connection condition is an equivalence condition, wherein the equivalence condition is used to indicate that a field value of a first field in a child node is the same as a field value of a second field in a parent node; and grouping the plurality of pieces of service data into the N data groups corresponding to the N worker threads based on field values of first fields in the plurality of pieces of service data upon determining that the connection condition is the equivalence condition; and the determining, by the current worker thread, a target worker thread corresponding to the third data to be used as the child node from the N worker threads comprises: determining, by the current worker thread, the target worker thread corresponding to the third data to be used as the child node from the N worker threads based on a field value of a second field in the third data to be used as the child node.

6. The method according to claim 5, further comprising:
determining, by the current worker thread, a target worker thread corresponding to the third data to be used as the child node from the N worker threads, and providing the third data to be used as the child node to the target worker thread, wherein in an (i+1)th query round, the third data to be used as the child node belongs to fourth data corresponding to the target worker thread.

7. The method according to claim 5, wherein
the grouping the plurality of pieces of service data into the N data groups corresponding to the N worker threads based on field values of first fields in the plurality of pieces of service data specifically comprises: determining hash values of the field values of the first fields in the plurality of pieces of service data, performing a first modulo operation on the hash values by using N, and grouping the plurality of pieces of service data into the N data groups corresponding to the N worker threads based on a result of the first modulo operation; and the determining, by the current worker thread, the target worker thread corresponding to the third data to be used as the child node from the N worker threads based on a field value of a second field in the third data to be used as the child node specifically comprises: determining, by the current worker thread, a hash value of the field value of the second field in the third data to be used as the child node, performing a second modulo operation on the hash value by using N, and determining the target worker thread corresponding to the third data to be used as the child node from the N worker threads based on a result of the second modulo operation.

8. The method according to claim 6, wherein
the grouping a plurality of pieces of service data in the target database table into N data groups corresponding to N worker threads based on the connection condition further comprises: grouping the plurality of pieces of service data into the N data groups corresponding to the N worker threads based on the total quantity N of the N worker threads upon determining that the connection condition is not the equivalence condition; and
the determining a target worker thread corresponding to the third data to be used as the child node comprises: determining the N worker threads as the target worker threads corresponding to the third data to be used as the child node.

9. The method according to claim 5, further comprising:
obtaining, by the current worker thread, a path corresponding to the root node and the fourth data in the tree structure; and
the querying, by the current worker thread based on the connection condition, third data to be used as a child node of the fourth data from the data group corresponding to the current worker thread comprises: querying, by the current worker thread, candidate data from the data group corresponding to the current worker thread based on the connection condition; and determining the candidate data as the third data to be used as the child node of the fourth data upon determining that the path does not comprise the candidate data.

10. The method according to claim 5, further comprising:
sending, by the current worker thread to a coordinator thread, an (i−1)th piece of end information indicating that the current worker thread completes the ith query round; and
upon determining that determining that the coordinator thread receives the (i−1)th piece of end information from the N worker threads, separately sending, by the coordinator thread to the N worker threads, start information indicating the N worker threads to perform the (i+1)th query round.

11. The method according to claim 5, further comprising:
using, as the child node of the fourth data in the current tree structure, the third data to be used as the child node.

12. A computing device for processing a hierarchical query request for requesting to query a target database table, the hierarchical query request comprises
a query start condition and a connection condition, the computing device comprising a memory and a processor, wherein the memory stores executable instructions that, in response to execution by the processor, cause the processor to:
in a first query round, query first data from the target database table based on the query start condition, and use the first data as a root node of a tree structure;
group a plurality of pieces of service data in the target database table into N data groups corresponding to N worker threads based on the connection condition, wherein N is an integer greater than 1; and
in an ith query round with i being greater than 1, select a leaf node in the current tree structure as a parent node; determine a target worker thread corresponding to the parent node from the N worker threads based on the connection condition, so that the target worker thread queries second data from the data group corresponding to the target worker thread based on the parent node and the connection condition; and use the second data as a child node of the parent node,
wherein the processor being caused to group a plurality of pieces of service data in the target database table into N data groups corresponding to N worker threads based on the connection condition comprises being caused to: determine whether the connection condition is an equivalence condition, wherein the equivalence condition is used to indicate that a field value of a first field in a child node is the same as a field value of a second field in a parent node; and group the plurality of pieces of service data into the N data groups corresponding to the N worker threads based on field values of first fields in the plurality of pieces of service data upon determining that the connection condition is the equivalence condition; and
the processor being caused to determine a target worker thread corresponding to the parent node from the N worker threads based on the connection condition comprises being caused to: determine the target worker thread corresponding to the parent node from the N worker threads based on the field value of the second field in the parent node upon determining that the connection condition is the equivalence condition.

\* \* \* \* \*